(12) United States Patent
Feldstein

(10) Patent No.: US 8,102,375 B1
(45) Date of Patent: Jan. 24, 2012

(54) DIMMABLE KEYPAD DEVICE SUITABLE FOR MULTIPLE FACEPLATE AND LEGEND COLORS

(75) Inventor: George Feldstein, Cresskill, NJ (US)

(73) Assignee: Crestron Electronics Inc., Rockleigh, NJ (US)

( * ) Notice: Subject to any disclaimer, the term of this patent is extended or adjusted under 35 U.S.C. 154(b) by 961 days.

(21) Appl. No.: 12/080,982

(22) Filed: Apr. 7, 2008

(51) Int. Cl.
G06F 3/02 (2006.01)
G09G 5/08 (2006.01)

(52) U.S. Cl. ............... 345/170; 345/102; 341/23

(58) Field of Classification Search .......... 345/102, 345/170, 173; 341/20–35
See application file for complete search history.

(56) References Cited

U.S. PATENT DOCUMENTS

| | | | |
|---|---|---|---|
| 4,320,268 A | 3/1982 | Brown | |
| 5,012,054 A | 4/1991 | Rada | |
| 5,951,349 A | 9/1999 | Larose | |
| 6,286,972 B1 | 9/2001 | Shepherd | |
| 7,236,154 B1 * | 6/2007 | Kerr et al. | 345/102 |
| 2005/0190142 A1 * | 9/2005 | Ferguson | 345/102 |
| 2006/0007107 A1 * | 1/2006 | Ferguson | 345/102 |
| 2006/0256067 A1 * | 11/2006 | Montero et al. | 345/102 |
| 2007/0070057 A1 * | 3/2007 | Sanoner et al. | 345/211 |
| 2008/0055265 A1 * | 3/2008 | Bewley et al. | 345/173 |

* cited by examiner

Primary Examiner — Alexander Eisen
Assistant Examiner — Sanjiv D Patel (57) ABSTRACT

A dimmable keypad device (20) includes a plurality of dimming curves stored in memory where each dimming curve corresponds to a combination of background and foreground colors. The dimmable keypad device includes a backlight (203), an ambient light sensor (201) to adjust the illumination of the backlight, key capsules (102) fabricated from substantially transparent plastic and having an opaque paint layer coating their outer surfaces. Key capsule lettering (103) is formed by the removal of a portion of the opaque paint layer and the lettering color, as seen by an observer (42), is formed by backlight illumination of the substantially transparent plastic. The backlight illumination is relatively high under a low ambient lighting condition and relatively low under a high ambient lighting condition when the opaque paint layer is white. The backlight illumination is relatively low under a low ambient lighting condition and relatively high under a high ambient lighting condition when the opaque paint layer is black.

18 Claims, 7 Drawing Sheets

DIMMABLE KEYPAD DEVICE SUITABLE FOR MULTIPLE FACEPLATE AND LEGEND COLORS

BACKGROUND OF THE INVENTION

1. Technical Field

The present invention relates to a keypad data entry devices and more specifically to keypad devices that have automatically dimmable lettering and or legends based on ambient light levels.

2. Background Art

Figure 1:
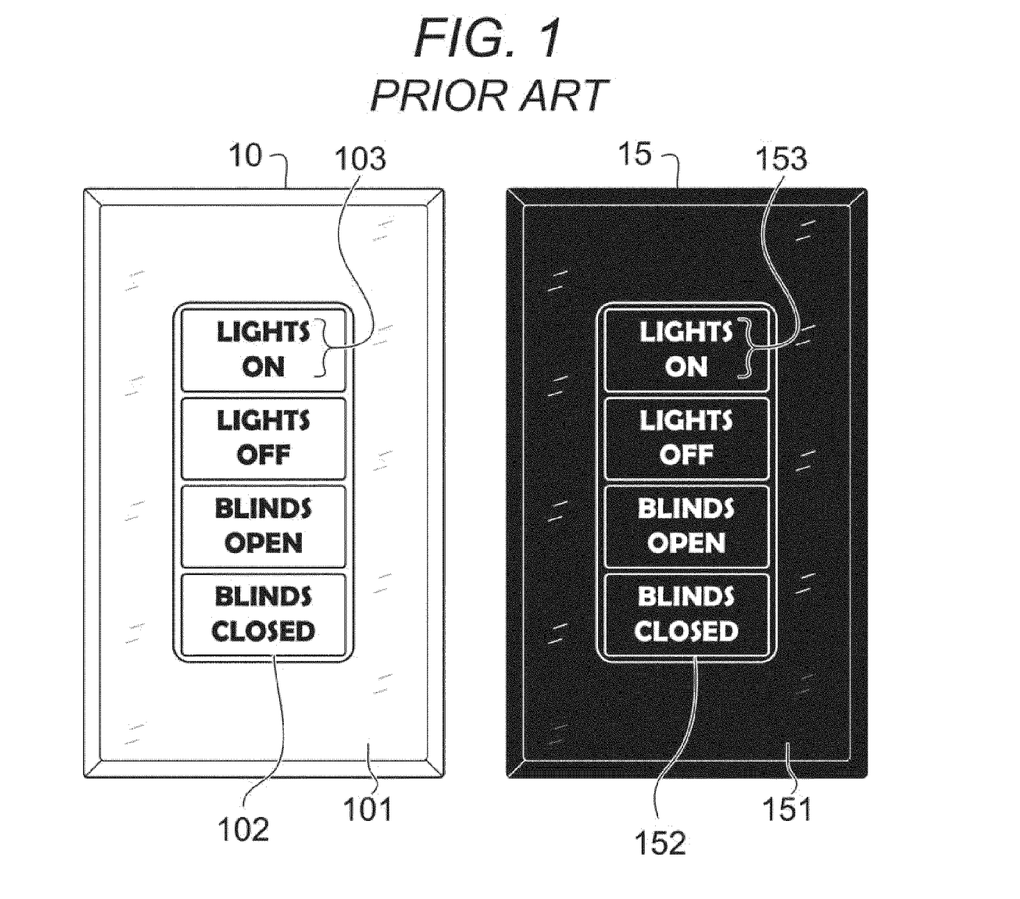
FIG. 1 depicts a white keypad device with black legends and a black keypad device with white legends as known in the prior art.

It is known to those skilled in the art, that keypad devices are available in a variety of foreground and background colors. For example, FIG. 1 shows two possible combinations of a faceplate background color and a key legend foreground color. The white keypad device 10 has a white colored faceplate 101 and white colored key capsules 102 with black legends 103. The black keypad device 15 has a black colored faceplate 151 and black colored key capsules 152 with white legends 153. According to the prior art, a white keypad device 10 and a black keypad device 15 with automatic dimming functionality are not interchangeable even if the faceplate and keys were replaceable because the automatic dimming curves are dependent on the corresponding background and foreground colors.

Figure 2:
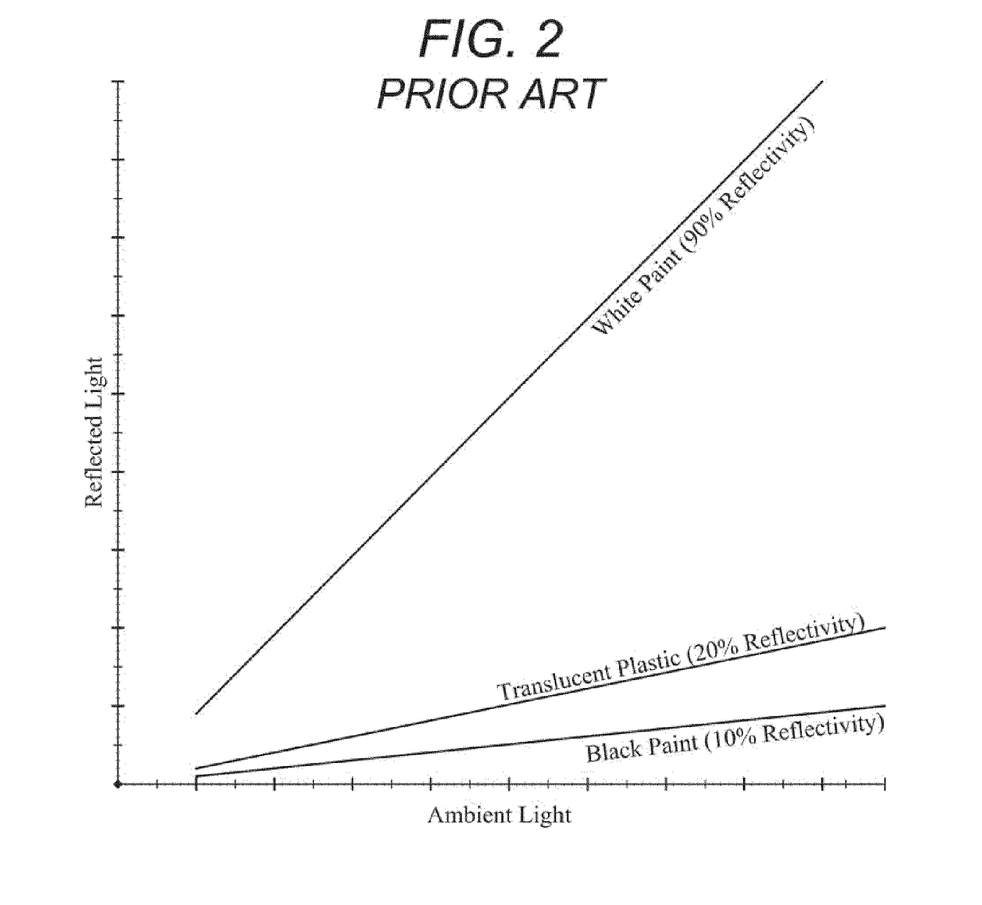
FIG. 2 illustrates the reflectivity of various paint finishes as known in the prior art.

It is common to backlight lighter color transparent or translucent foregrounds on darker color backgrounds by increasing the backlight level intensity as the ambient light level increases. However, this technique will not work in the case of a light color background such as white with a darker colored backlit transparent or translucent foreground color such as gray. In this case, increasing the backlight intensity as the ambient light increases will create a wide range of ambient light levels during which the foreground color vanishes. This optical effect is well known and techniques of this type have been used in magician's tricks and military camouflage. This is illustrated in FIG. 2. When a backlight is combined with reflected ambient light from the translucent plastic foreground to approximate the amount of ambient light that would be reflected from the light background (e.g. white paint at 90% reflectivity), the legend is 'washed out'.

In addition, a homeowner wishing to change the color theme has no choice but to replace an entire keypad device. Also, service technicians need to carry spare parts of each entire keypad device.

To solve the aforementioned problems associated with carrying extra spares, etc., the present invention is an automatically dimmable keypad device which stores a number of dimming curves corresponding to various combinations of background and foreground colors.

SUMMARY OF THE INVENTION

The following summary of the invention is provided to facilitate an understanding of some of the innovative features unique to the present invention. A full appreciation of the various aspects of the invention can only be gained by taking the entire specification, claims, drawings, and abstract as a whole.

The invention is an automatically dimmable keypad device which stores a number of dimming curves corresponding to various combinations of background and foreground colors. To backlight buttons with a light colored background and a darker colored foreground, a light dimming curve is employed which establishes a minimum backlight level with zero ambient. As ambient light increases, the backlight intensity must increase until a critical (threshold) ambient light level is reached. This critical (threshold) ambient light level is determined by the specific combination of foreground and background colors. Further increases of the ambient light level past the critical (threshold) point will cause the backlight intensity to decrease until the back light is off. In this case, the foreground color must be translucent thus as ambient light is increased the foreground color reflect the ambient light.

According to a first aspect, the present invention provides a dimmable keypad device comprising a backlight, an ambient light sensor, a plurality of key capsules, and control electronics. The control electronics adjust the illumination of the backlight. The key capsules are fabricated from substantially transparent plastic and each key capsule further comprises an outer surface facing an observer and an inner surface facing the backlight, an opaque paint layer coating the outer surface of the key capsule. At least one key capsule includes lettering formed by the removal of a portion of the opaque paint layer with the lettering color, as seen by the observer, formed by backlight illumination of the substantially transparent plastic. The backlight illumination is relatively high under a low ambient lighting condition and relatively low under a high ambient lighting condition when the opaque paint layer is white. The backlight illumination is relatively low under a low ambient lighting condition and relatively high under a high ambient lighting condition when the opaque paint layer is black.

According to a second aspect, the present invention provides a dimmable keypad device comprising a key capsule, a backlight, an ambient light sensor, control electronics including memory, and a plurality of dimming curves stored in the memory, where each dimming curve corresponds to a predetermined combination of background and foreground colors. The key capsule has a background of a first color and a foreground legend of a second color which overlays a portion of the background. The backlight is adapted to illuminate this key capsule legend. The ambient light sensor is adapted to measure an ambient light level. One of the dimming curves is preselected in accordance with the first (background) and second (foreground legend) colors. The control electronics adjusts the illumination of the backlight based on the ambient light level according to the preselected dimming curve.

According to a third aspect, the present invention provides a method for converting a dimmable keypad device from a first color theme to a second color theme comprising the steps of providing, within the dimmable keypad device, a plurality of dimming curves stored in a memory where each dimming curve corresponds to a predetermined combination of background and foreground colors, removing a faceplate of a first background color, removing a plurality of key capsules of the first background color, installing a faceplate of a second background color, installing a plurality of key capsules of the second background, identifying a foreground color for the plurality of key capsules, and selecting a dimming curve according to the second background color and the identified foreground color.

The present invention seeks to overcome or at least ameliorate one or more of several problems, including but not limited to: providing standard and preset dimming curves suitable for different background and foreground colors of keypad devices. More specifically, the present invention provides a keypad device that can be customized with various colored faceplates and key capsules.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to".

BRIEF DESCRIPTION OF DRAWINGS

The accompanying figures further illustrate the present invention.

Brief Description of the Several Views of the Drawing

LIST OF REFERENCE NUMBERS FOR THE MAJOR ELEMENTS IN THE DRAWING

The following is a list of the major elements in the drawings in numerical order.

```
10   white keypad device (white faceplate and black legend)
15   black keypad device (black faceplate and white legend)
20   dimmable keypad device
31   background color (white key capsule)
32   foreground color (black legend)
33   background color (black key capsule)
34   foreground color (white legend)
41   ambient light source
42   observer (homeowner)
51   dimming curve for white faceplate and black legend
52   dimming curve for black faceplate and white legend
61   dimming curve for white faceplate and transparent legend
62   dimming curve for black faceplate and transparent legend
101  white faceplate
102  white key capsule
103  black legend (on white key capsule 102)
151  black faceplate
152  black key capsule
153  white legend (on black key capsule 152)
201  ambient light sensor
202  light source
203  backlight (light guide)
205  control electronics (p/o keypad device 20)
511  threshold value (white faceplate/black legend)
512  minimum automatic backlight level (white faceplate/black legend)
513  maximum automatic backlight level (white faceplate/black legend)
521  threshold value (black faceplate/white legend)
522  minimum automatic backlight level (black faceplate/white legend)
523  maximum automatic backlight level (black faceplate/white legend)
611  threshold value (white faceplate/transparent legend)
612  minimum automatic backlight level (white faceplate/transparent legend)
613  maximum automatic backlight level (white faceplate/transparent legend)
621  threshold value (black faceplate/transparent legend)
622  minimum automatic backlight level (black faceplate/transparent legend)
623  maximum automatic backlight level (black faceplate/transparent legend)
```

DETAILED DESCRIPTION OF THE INVENTION

The present invention is designed to allow residential electrical contractors to use a single type keypad device that can be readily adapted to different faceplate and letting color combinations.

MODE(S) FOR CARRYING OUT THE INVENTION

As described previously, present practice provides for choosing a non-keypad with a fixed color scheme. There is no provision for modifying either the faceplate color or the lettering and legends color while still maintaining an optimal automated dimming function. There are also no light colored background switches in the prior art white the light background is opaque and the switch legends are backlit.

Figure 3:
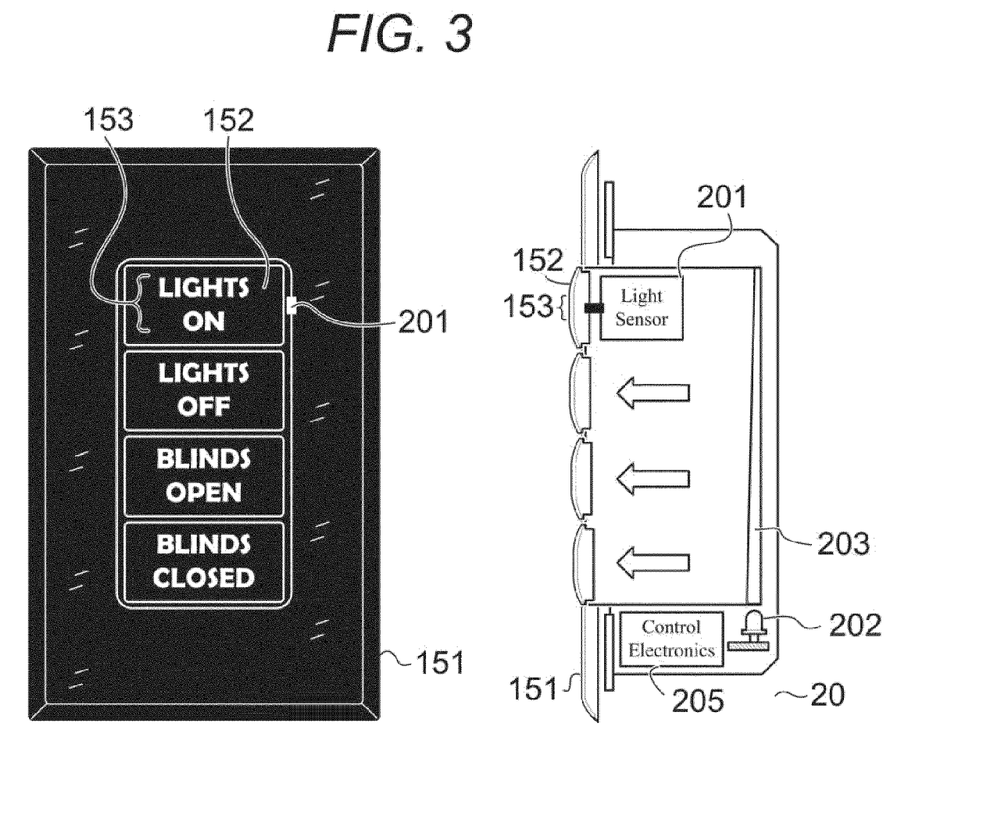
FIG. 3 illustrates an inventive dimmable keypad device configured with a black faceplate, black keys, and white legends in accordance with one illustrative embodiment of the present invention.

Refer now to FIG. 3 which shows a dimmable keypad device 20 that includes a black faceplate 151, black key capsules 152, and white legends 153, such as lettering. The keypad device 20 internally includes an ambient light sensor 201 and a backlight 203 that illuminates the key capsules 152 from behind. In the embodiment shown, the backlight consists of a light guide and a light source 202, such as a light emitting diode (LED). The brightness of the backlight is adjusted by control electronics 250 within the keypad device 20.

The ambient light sensor 201 is used to automatically adjust the intensity levels for the backlight. In a preferred embodiment, the ambient light level as measured by the ambient light sensor 201 is filtered to prevent small changes in the ambient light level from turning the backlight on or off. This is accomplished by applying both a low pass filter and hysteresis to the ambient light sensor 201 output. We have discovered that a low-pass filter with a step-response rise time (i.e. 10% to 90%) of approximately 3 seconds yields satisfactory results.

In yet a further embodiment, a 1-second fade action is implemented whenever the backlight is turned on or off.

Figure 4:
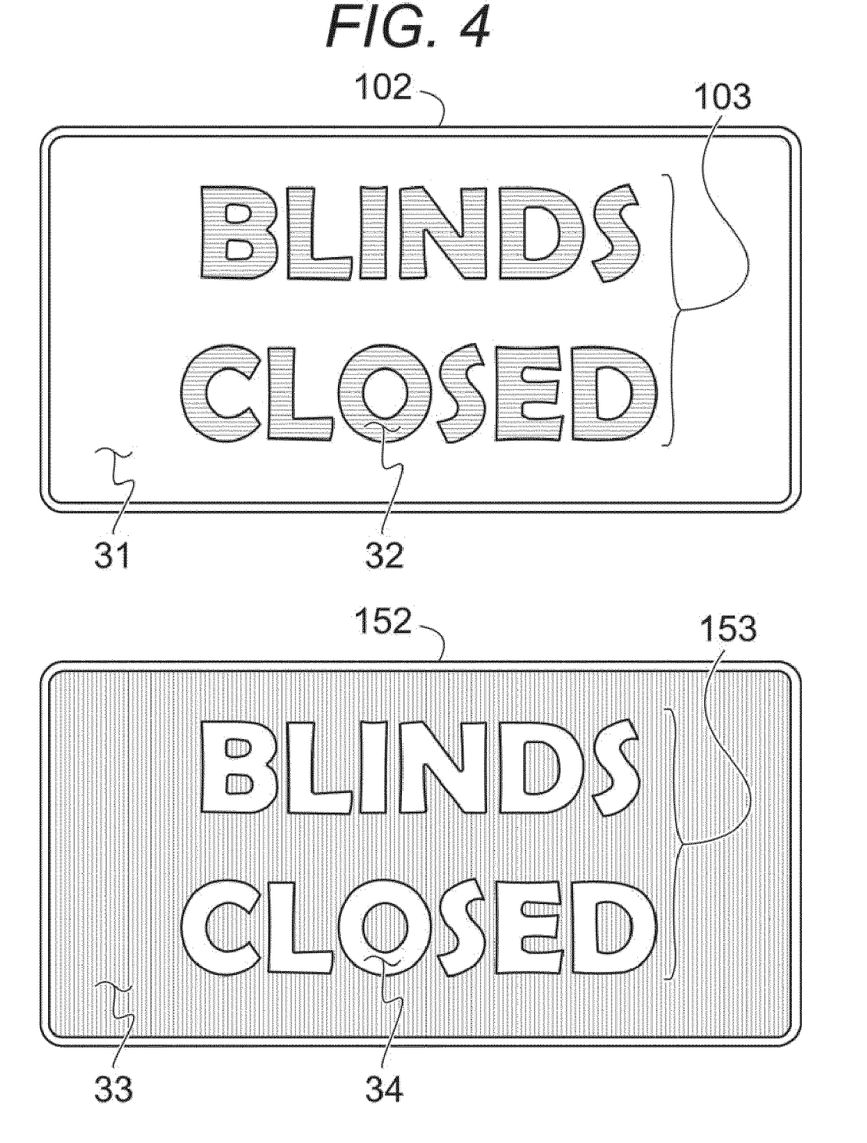
FIG. 4 illustrates a single white key capsule with a black legend and a single black key capsule with a white legend.

Refer to FIG. 4 and continue to refer to FIG. 3. The backlight 203 intensity which determines the legend 153 intensity is set by selecting one of the dimming curves that are stored in memory. According to the present invention, there are stored a number of such dimming curves, where each of these curves corresponds to an allowable combination of background and foreground colors. For example, FIG. 2 shows a black background color and a white foreground color and FIG. 4 shows a black background color and a white foreground color.

According to the present invention, a key capsule 102 or 152 is fabricated from substantially transparent plastic and includes an outer surface (e.g. facing an observer) and an inner surface facing the backlight 203. Certain embodiments of the present invention use 'reflective' legends while other embodiments use 'transmissive' legends. The reflective and transmissive terminology refers to the legends as viewed under ambient lighting conditions; both legends are illuminated from behind by a backlight.

For a reflective legend embodiment having a white background and a black foreground, a white key capsule 102 has an outer surface that is coated first with a lower layer of dark gray translucent paint 32 and then with an upper layer of white opaque paint 31. The foreground legend 103, such as lettering, is formed by the removal of a portion of the outer white opaque paint layer 31 such as by laser etching, to expose the lower dark gray translucent paint layer 32, which appears 'black' to an observer when viewed under ambient light. In a preferred embodiment, the inner surface is coated with white translucent paint to distribute the back light evenly and the outer surface is then further coated with a layer of flat finish clear paint.

For a transmissive legend embodiment having a white background and a transparent (black) foreground, a white key capsule 102 has an outer surface that is coated with a layer of white opaque paint 31. The foreground legend 103, such as lettering, is formed by the removal of a portion of the outer paint layer 31, such as by laser etching, to expose the substantially transparent plastic, which appears 'black' to an observer when viewed under ambient light. In this embodiment, the backlight intensity is set relatively high for low ambient light conditions and relatively low for high ambient light conditions.

In one further embodiment, the inner surface is coated with light gray translucent paint to distribute the back light evenly.

For a reflective legend embodiment having a black background and a white foreground, a black key capsule 152 has an outer surface that is coated first with a lower layer of white translucent paint 34 and then with an upper layer of black opaque paint 33. The foreground legend 153, such as lettering, is formed by the removal of a portion of the outer black opaque paint layer 33 such as by laser etching, to expose the lower white translucent paint layer 34. In a preferred embodiment, the inner surface is coated with white translucent paint to distribute the light evenly and the outer surface is then further coated with a layer of flat finish clear paint.

For a transmissive legend embodiment having a black background and a transparent (white) foreground, a black key capsule 152 has an outer surface that is coated with a layer of black opaque paint 33 and an inner surface that is coated with a layer of white translucent paint 34. The foreground legend 153, such as lettering, is formed by the removal of a portion of the outer paint layer 33, such as by laser etching, to expose the substantially transparent plastic, which appears 'white' to an observer when viewed under ambient light and back lit with a relatively high intensity backlight. In this embodiment, the backlight intensity is set relatively high for high ambient light conditions and relatively low for low ambient light conditions.

Those skilled in the art will recognize that the keypad device faceplate and key capsules can be fabricated to have either a textured or smooth surface finish. Accordingly, the present invention contemplates prestored dimming curves corresponding to various surface finishes in addition to background and foreground color combinations.

Figure 5:
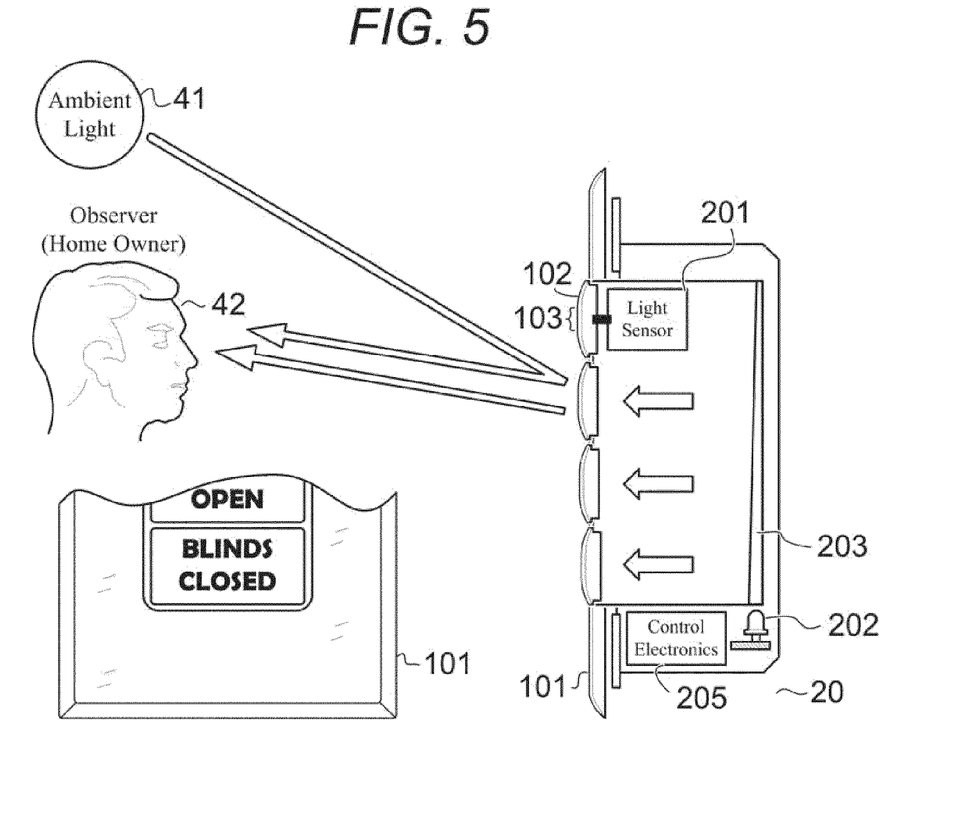
FIG. 5 depicts the inventive dimmable keypad device configured with a white faceplate, white keys, and black legends being observed under ambient lighting conditions.

Refer now to FIG. 5 which shows the inventive dimmable keypad device configured with a white faceplate 101, white keys 102, and black legends 103 being observed under ambient lighting 41 conditions. However, the discussion below applies to all combinations of background and foreground colors within the scope of the present invention.

It is an objective of the present invention to make multiple keypad devices 20, when mounted side-by-side, to have similar illumination as seen by an external observer 42. There will likely be manufacturing variation in the ambient light sensors 201 from unit to unit and the ambient light 41 may not hit all keypad devices 20 identically. Accordingly, when two or more dimmable keypad devices 20 are installed side-by-side, it is advantageous to have one ambient light sensor 201 act as a master for each of the multiple keypad devices 20. The master ambient light sensor 201 therefore provides such a signal to each of the other keypad devices.

Figure 6:
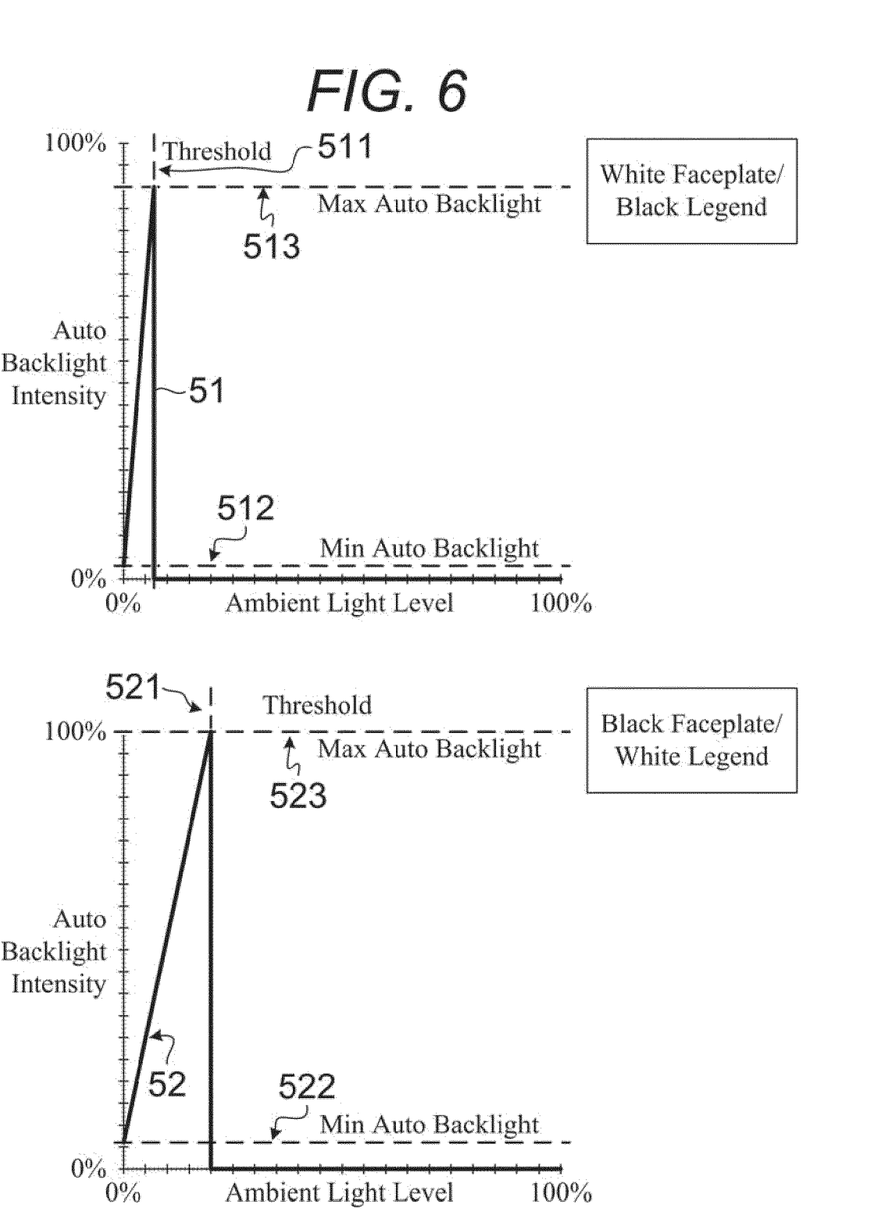
FIG. 6 shows dimming curves for the inventive keypad device, having reflective legends, being configured with a white faceplate and for the inventive keypad device being configured with a black faceplate in accordance with one illustrative embodiment of the present invention.

Refer now to FIG. 6 which shows two illustrative dimming curves for the inventive keypad device which are applicable to key capsules having reflective legends, such as those fabricated with two paint layers on the outer surface.

The first illustrative dimming curve 51 is a limited range linear relationship between ambient light level and automatic backlight intensity suitable for a white background (white faceplate 101 and key capsules 102) and a black foreground (key legend 103). The first dimming curve 51 shows such a white faceplate threshold 511, a white faceplate minimum automatic backlight level 512, and a white faceplate maximum automatic backlight level 513. It will be apparent to those skilled in the art that other combinations of background and foreground colors are used in lighted switch applications, such as an almond background with a black foreground.

The second dimming curve 52 is a limited range linear relationship between ambient light level and automatic backlight intensity suitable for a black background (black faceplate 151 and key capsules 152) and a white foreground (key legend 153). The second dimming curve 52 shows such a black faceplate threshold 521, a black faceplate minimum automatic backlight level 522, and a black faceplate maximum automatic backlight level 523.

Figure 7:
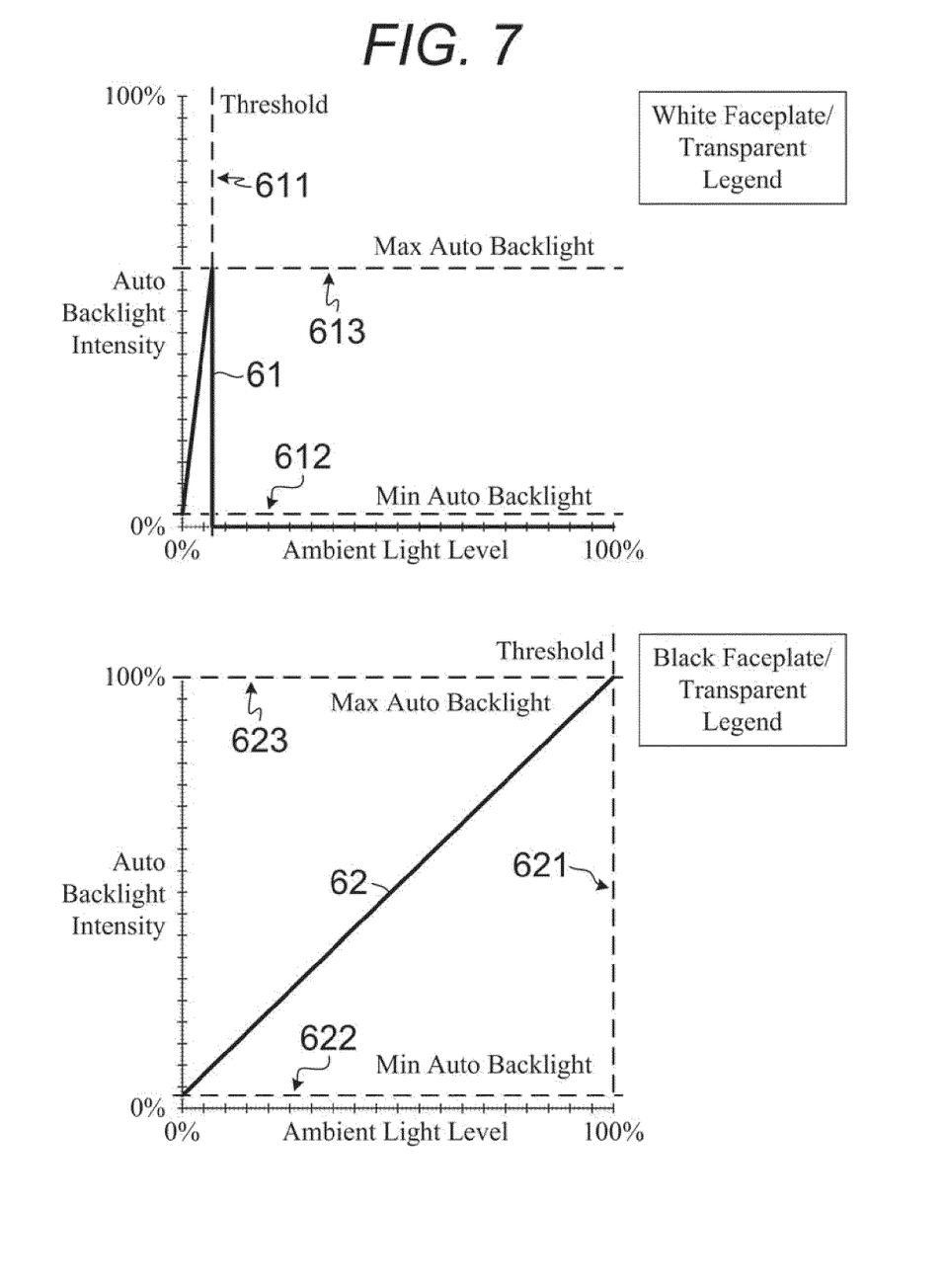
FIG. 7 shows dimming curves for the inventive keypad device, having transparent/translucent legends, being configured with a white faceplate and for the inventive keypad device being configured with a black faceplate in accordance with one illustrative embodiment of the present invention.

Finally refer to FIG. 7 which shows two illustrative dimming curves for the inventive keypad device which are applicable to key capsules having transmissive legends, such as those fabricated with one paint layer on the outer surface.

The first illustrative dimming curve 61 is a limited range linear relationship between ambient light level and automatic backlight intensity suitable for a white background (white faceplate 101 and key capsules 102) and a transparent (black) foreground (key legend 103). The first dimming curve 61 shows such a white faceplate threshold 611, a white faceplate minimum automatic backlight level 612, and a white faceplate maximum automatic backlight level 613. It is important to note that the backlight intensity is set relatively high for low ambient light conditions and relatively low for high ambient light conditions. However, the backlight is lowered to zero intensity at the threshold 611 rather than by a downward linear relationship in order to avoid a cross over point in which the backlight and ambient light would be approximately equal resulting in the key legend being 'washed out'.

The dimming relationship shown by curve 61 has not previously been used in the field of residential lighting control and as such care must be given to determining the various parameters. For instance, the maximum automatic backlight level 613 is determined empirically by determining at what point the backlight becomes objectionably bright in a dimly lit room. The transition from maximum automatic backlight level 613 to minimum automatic backlight level 612 is shown as a step function although the inventor contemplates more complex linear and non-linear relations as well. In addition, although not shown, preferred embodiments include hysteresis in the transition from maximum automatic backlight to minimum automatic backlight and vice-versa.

The second dimming curve 62 is a limited range linear relationship between ambient light level and automatic backlight intensity suitable for a black background (black faceplate 151 and key capsules 152) and a black foreground (key legend 153). The second dimming curve 62 shows such a black faceplate threshold 621, a black faceplate minimum automatic backlight level 622, and a black faceplate maximum automatic backlight level 623. It is important to note that the backlight intensity is set relatively high for high ambient light conditions and relatively low for low ambient light conditions.

In these embodiments that use a linear relationship, the intensity of the backlight 203 is in direct proportion to the ambient light 41 level over a (limited) range Typically, when there is more ambient light in the room, the brighter the backlight shall be, up to a certain point (e.g. threshold). In these embodiments, the backlight intensity (e.g. dimming curve) is set via three parameters.

1) threshold value 511, 521, 611, 621
2) minimum automatic backlight level 512, 522, 612, 622
3) maximum automatic backlight level 513, 523, 613, 623

The relationship for the (limited range) linear relationship is as follows.

EQ. 1 IF Ambient Light Level <=Threshold
THEN Backlight Intensity=MinAuto+(MaxAuto−MinAuto)*Ambient Light Level/Threshold
ELSE Backlight Intensity=0%

We have discovered that for the certain background foreground color combinations listed, that the following parameters yield satisfactory for a dimmable keypad device as described herein.

TABLE 1

| Background | Foreground | Threshold | MinAuto | MaxAuto |
|---|---|---|---|---|
| White | Black | 7% | 3% | 90% |
| Almond | Black | 7% | 3% | 90% |
| Black | White | 20% | 6% | 100% |
| White | Transparent | 20% | 3% | 60% |
| Black | Transparent | 100% | 3% | 100% |

Finally, assume that a home owner wishes to change the color theme of a particular keypad device without any rewiring such as would be required in the prior art. The home owner would remove the faceplate and key capsules which have the undesired background color from the dimmable keypad device, install a new faceplate and key capsules which have the desired background color, identify the desired foreground color, and selecting the appropriate dimming curve from the for the new background and foreground color. Advantageously, such selection could be done over a computer network in communication with the dimmable keypad device.

In an embodiment of the invention, the home owner does not identify the desired foreground color and select the appropriate dimming curve for the new background and foreground color. In this embodiment, the dimmable keypad device further comprises a sensor, such as would be known to one skilled in the art, configured for detecting the background color and key legend (i.e. foreground color). The control electronics 205 of the dimmable keypad automatically selects the appropriate dimming curve according the background color and key legend as determined by the sensor.

LIST OF ABBREVIATIONS USED IN THE DETAILED DESCRIPTION OF THE INVENTION

The following is a list of the abbreviations used in the specification in alphabetical order.
MaxAuto maximum automatic backlight level
MinAuto minimum automatic backlight level

LIST OF ACRONYMS USED IN THE DETAILED DESCRIPTION OF THE INVENTION

The following is a list of the acronyms used in the specification in alphabetical order.
LED light emitting diode

ALTERNATE EMBODIMENTS

Alternate embodiments may be devised without departing from the spirit or the scope of the invention.

For example, certain alternate embodiments may have a faceplate and key capsules with a black background and red lettering on a first set of keys, yellow lettering on a second set of keys, and green lettering on a third set of keys where each set of keys has its own backlight and associated dimming curve.

What is claimed is:
1. A dimmable keypad device comprising:
(a) a key capsule having a background of a first color and a foreground legend overlaying a portion of said background;
(b) a backlight adapted to illuminate the key capsule legend as seen by an observer;
(c) an ambient light sensor adapted to measure an ambient light level;
(d) control electronics including memory; and
(e) a plurality of dimming curves stored in the memory where each dimming curve corresponds to a predetermined combination of background and foreground colors;
(f) wherein one of the dimming curves is preselected in accordance with the first color and the foreground legend; and
(g) wherein the control electronics is configured to adjustably control the illumination of the backlight based on the ambient light level according to the preselected dimming curve.

2. The keypad device according to claim 1, wherein:
(a) the key capsule is fabricated from substantially transparent plastic and further comprises an outer surface facing the observer and an inner surface facing the backlight;
(b) the first color comprises a layer of white opaque paint which coats the outer surface of the key capsule; and
(c) the key capsule legend, as seen by the observer, is formed by
(i) a relatively high backlight illumination of the substantially transparent plastic under a low ambient lighting condition, and
(ii) a relatively low backlight illumination of the substantially transparent plastic under a high ambient lighting condition.

3. The keypad device according to claim 1, wherein:
(a) the key capsule is fabricated from substantially transparent plastic and further comprises an outer surface facing the observer and an inner surface facing the backlight;
(b) the first color comprises a layer of black opaque paint which coats the outer surface of the key capsule;
(c) the key capsule legend, as seen by the observer, is formed by
(i) a relatively low backlight illumination of the substantially transparent plastic under a low ambient lighting condition, and (ii) a relatively high backlight illumination of the substantially transparent plastic under a high ambient lighting condition.

4. The keypad device according to claim 1, wherein:
   (a) the key capsule is fabricated from substantially transparent plastic and further comprises an outer surface facing the observer and an inner surface facing the backlight;
   (b) the inner surface is coated with a light diffusing layer of paint;
   (c) the outer surface is coated with an inner layer of paint of a second color;
   (d) the inner layer of paint of the second color is coated with an outer layer of paint of the first color; and
   (e) the foreground legend is formed by the removal of a portion of the outer paint layer.

5. The keypad device according to claim 4, wherein:
   (a) the paint of the first color is white opaque paint;
   (b) the paint of the second color is dark gray translucent paint;
   (c) the diffusing layer of paint is a layer of translucent white paint; and
   (d) the outer surface is further coated with a layer of flat finish clear paint after the foreground legend has been formed.

6. The keypad device according to claim 4, wherein:
   (a) the paint of the first color is black opaque paint;
   (b) the paint of the second color is white translucent paint; and
   (c) the outer surface is further coated with a layer of flat finish clear paint after the foreground legend has been formed.

7. The keypad device according to claim 1, wherein:
   (a) the backlight further comprises a light-emitting diode and a light guide.

8. The keypad device according to claim 1, wherein:
   (a) the ambient light sensor is remotely mounted.

9. The keypad device according to claim 1, wherein
   (a) the ambient light level as measured by the ambient light sensor is filtered to prevent small changes in the ambient light level from turning the backlight on or off; and
   (b) said filtering comprises
      (i) a low pass filter with a step-response rise time, between 10% to 90%, of approximately 3 seconds, and
      (ii) hysteresis.

10. The keypad device according to claim 9, wherein a 1-second fade action is implemented whenever the backlight is turned on or off.

11. The keypad device according to claim 1, wherein each of the plurality of dimming curves further comprises:
    (a) a predetermined threshold value (511);
    (b) a predetermined minimum automatic backlight level (512); and
    (c) a predetermined maximum automatic backlight level (513).

12. The keypad device according to claim 11, wherein the plurality of dimming curves comprises:
    (a) a first curve (51) corresponding to a white color background and black color foreground legends, said first curve having a threshold value (511) of substantially 7%, a minimum automatic backlight level (512) of substantially 3%, and a maximum automatic backlight level (513) of substantially 90%;
    (b) a second curve (52) corresponding to a black color background and white color foreground legends, said second curve having a threshold value (521) of substantially 20%, a minimum automatic backlight level (522) of substantially 6%, and a maximum automatic backlight level (523) of substantially 100%;
    (c) a third curve (61) corresponding to a white color background and transparent foreground legends, said third curve having a threshold value (611) of substantially 7%, a minimum automatic backlight level (612) of substantially 3%, and a maximum automatic backlight level (613) of substantially 60%; and
    (d) a fourth curve (62) corresponding to a black color background and transparent color foreground legends, said fourth curve having a threshold value (621) of substantially 100%, a minimum automatic backlight level (622) of substantially 3%, and a maximum automatic backlight level (623) of substantially 100%.

13. The keypad device according to claim 1, further comprising:
    (a) a faceplate of the first color.

14. The keypad device according to claim 1, further comprising:
    (a) a sensor adapted to detect the background color and key legend; and
    (b) wherein the control electronics is further configured to automatically select the preselected dimming curve based on the detected colors.

15. The keypad device according to claim 1, wherein said plurality of dimming curves further comprise:
    (a) dimming curves corresponding to a combination of background and foreground colors and surface finish.

16. The keypad device according to claim 15, wherein said surface finish is selected from the group consisting of:
    (a) textured finish and smooth finish.

17. A method of converting a dimmable keypad device from a first color theme to a second color theme, said method comprising the steps of:
    (a) providing, within said dimmable keypad device, a plurality of dimming curves stored in a memory where each dimming curve corresponds to a predetermined combination of background and foreground colors;
    (b) removing a faceplate of a first background color from the dimmable keypad device;
    (c) removing a plurality of key capsules of the first background color from the dimmable keypad device;
    (d) installing a faceplate of a second background color to the dimmable keypad device;
    (e) installing a plurality of key capsules of the second background color to the dimmable keypad device;
    (f) identifying a foreground color for the plurality of key capsules; and
    (g) selecting a dimming curve from the plurality of dimming curves according to the second background color and the identified foreground color.

18. The keypad device according to claim 12, wherein the plurality of dimming curves further comprises:
    (a) a fourth curve corresponding to an almond color background and black color foreground legends; and
    (b) a fifth curve corresponding to an almond color background and transparent color foreground legends.

* * * * *